A. Hamar.
Smelting & Desulphurizing Iron Ore.
No. 74217. Patented Feb. 11, 1868.
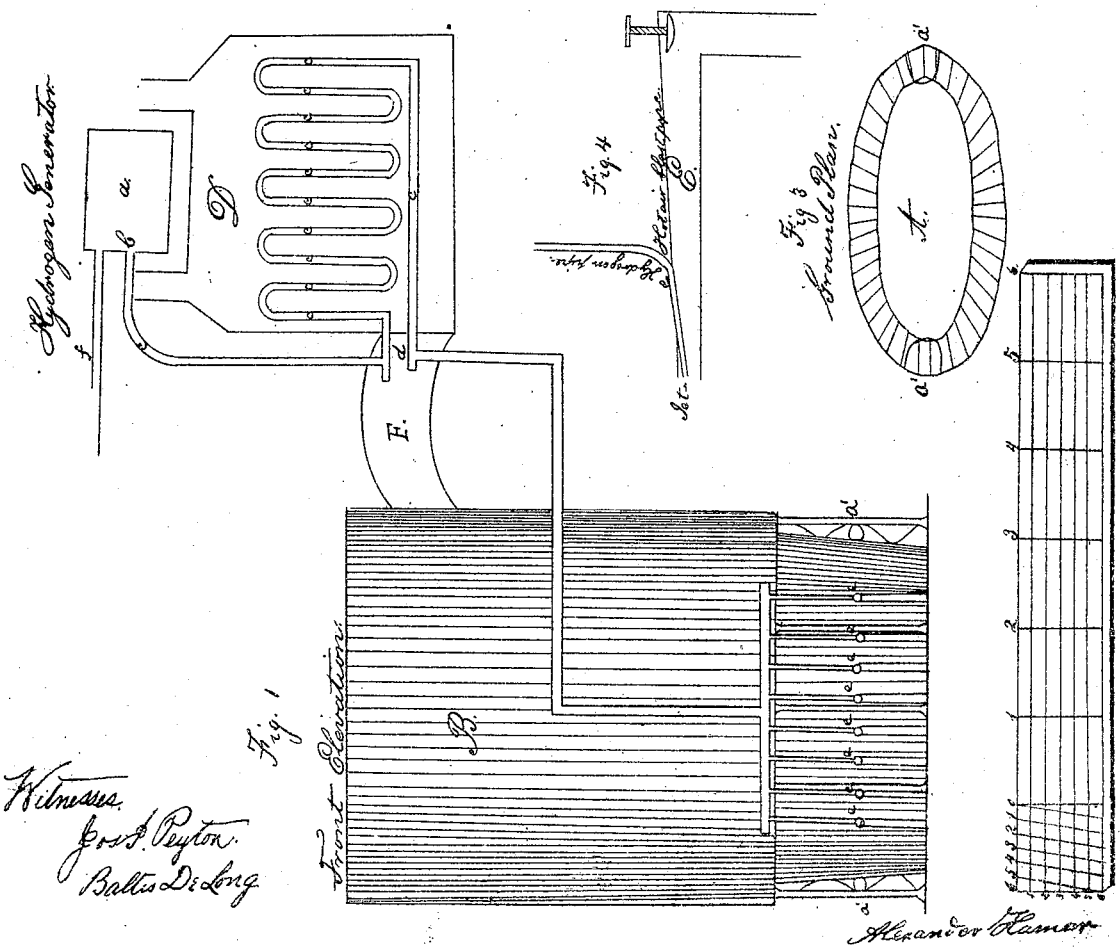

United States Patent Office.

ALEXANDER HAMAR, OF NEW YORK, N. Y.

Letters Patent No. 74,217, dated February 11, 1868.

---

IMPROVEMENT IN SMELTING AND DESULPHURIZING IRON ORE.

---

The Schedule referred to in these Letters Patent and making part of the same.

---

TO ALL WHOM IT MAY CONCERN:

Be it known that I, ALEXANDER HAMAR, of the city, county, and State of New York, have invented a new and improved Method of Smelting and Desulphurizing Iron and Iron Ores, of which the following is a full, clear, and exact description, reference being had to the accompanying drawings, which make part of this specification, and in which—

Figure 1 represents a view in elevation of so much of my improved apparatus as is necessary to illustrate my invention.

Figure 2, a vertical central section through the body of the furnace.

Figure 3, a view in perspective of the foundation of the same, and

Figure 4 a diagram of the blast-pipes.

It is the object of my invention to produce a superior quality of iron by depriving it of its sulphur; and, to this end, the invention herein claimed consists in a novel method, hereinafter described, of mixing hydrogen with the iron or iron ore during the process of smelting or puddling.

In the accompanying drawings, which represent my improvements as adapted to use in a blast-furnace for smelting iron ore, the furnace A B C is shown as made in an elliptical form, in horizontal section, but of varying internal capacity, being of less sectional area at the top and bottom than in the central portions, as clearly shown in fig. 2.

The advantages of this form of furnace are that it admits of more convenient access, as both breasts are open instead of one, and the narrow sides permit the blast to penetrate the charge more perfectly.

Openings, $a'$, are left in the breasts of the furnace in the usual way, for convenience of access to its interior, and for the removal of its contents. A set of tuyeres, $e$, is, in like manner, inserted in the side walls for the introduction of the blast.

I propose to desulphurize the ore by mixing hydrogen with it through the medium of the blast. The apparatus for generating this hydrogen is shown in fig. 1. A chamber, $a$, is filled with coarse iron filings, and with charcoal in lumps, about the size of a cherry, in the proportion of about two-thirds iron filings and one-third charcoal. Steam is injected into this chamber through a pipe, $f$, leading from a boiler, and is partially deoxidized by passing through the iron filings and charcoal, after which it escapes at $b$, and passes through a coil of highly-heated pipes, $c$, contained in a heating-chamber, D, warmed by gases, conveyed into it from the furnace through a pipe, F, from the gas-chamber $f'$. The chamber $a$ is also heated by the same means. In passing through the heated pipes, the steam is still further deoxidized by the absorption of its oxygen by the pipes. It is then conducted, through the pipe $d$, to the lower part of the furnace, whence the pipe divides into branches, corresponding in number with the tuyeres, into which they introduce the deoxidized steam, as shown in fig. 3. The steam thus deoxidized is nearly pure hydrogen. A blast of hot air is thrown in through the pipes E, in the usual way, and, after mingling with the deoxidized steam, passes into the furnace, and mingles with the charge, thus producing a high degree of heat. The hydrogen of the steam also combines with the sulphur contained in the fuel as well as with that of the ore to form sulphuretted hydrogen, which escapes with the other volatile products of combustion. I thus desulphurize the metal and economize fuel.

It is obvious that my invention may readily be adapted for use in either a cupola or a puddling-furnace. When used in a puddling-furnace, I supply independent jets of hydrogen over the iron and over the fuel, to desulphurize them separately, and convey away the products of combustion of each by separate channels. The blast may be heated passing through the chamber D, or the tubes $e$ may lead directly into the air-heating pipes.

What I claim as my invention, and desire to secure by Letters Patent, is—

1. The method, herein described, of desulphurizing both the ore and the fuel in a blast-furnace by the introduction of nearly pure hydrogen, in combination with the blast, as set forth.

2. The method, herein described, of desulphurizing both the coal and the iron in a puddling-furnace by means of separate jets of hydrogen, as set forth.

In testimony whereof, I have hereunto subscribed my name.

A. HAMAR.

Witnesses:
 JOS. I. PEYTON,
 BALTIS DE LONG.